W. F. POTTER.
AUTOMOBILE SIGNAL LAMP.
APPLICATION FILED MAR. 23, 1921.
1,435,080. Patented Nov. 7, 1922.
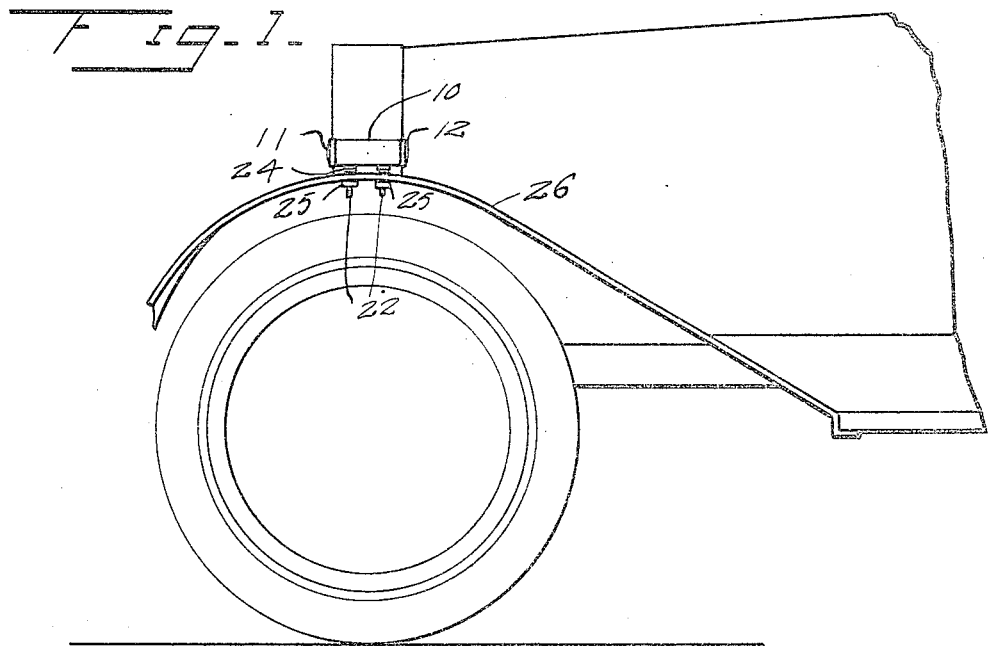
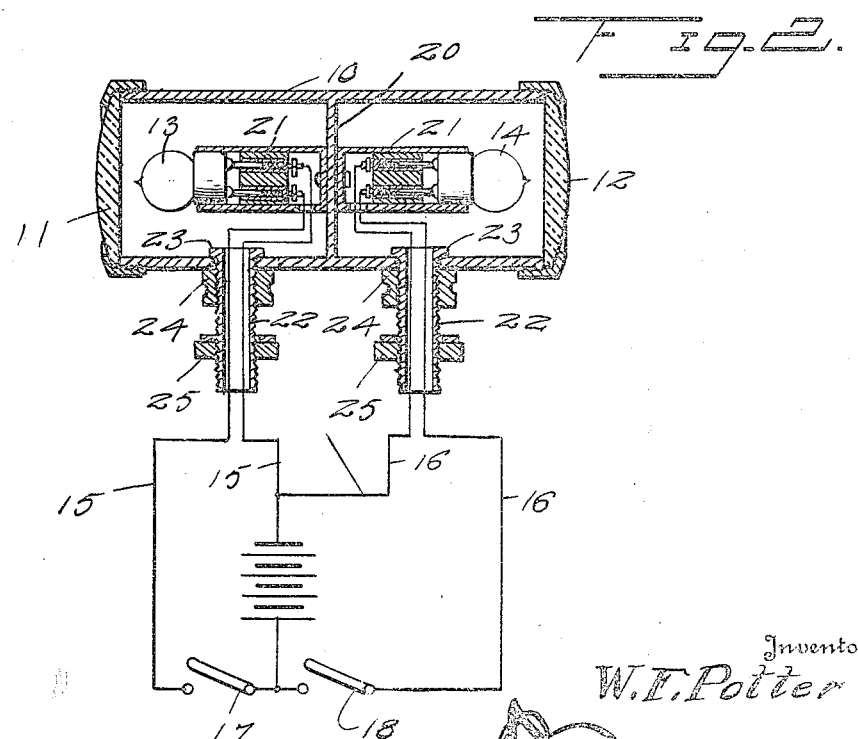
Inventor
W. F. Potter Patented Nov. 7, 1922.

1,435,080

UNITED STATES PATENT OFFICE.

WILLIAM F. POTTER, OF ELMIRA, NEW YORK.

AUTOMOBILE SIGNAL LAMP.

Application filed March 23, 1921. Serial No. 454,652.

*To all whom it may concern:*

Be it known that I, WILLIAM F. POTTER, a citizen of the United States, residing at Elmira, in the county of Chemung, and State of New York, have invented certain new and useful Improvements in an Automobile Signal Lamp; and I do hereby declare the following to be a full, clear, and exact description of the invention, such as will enable others skilled in the art to which it appertains, to make and use the same.

The object of the invention is to provide simple and efficient means to serve as a guide to indicate the position and direction of movement of an automobile or similar motor driven vehicle with the object of minimizing accidents incident to uncertainty as to position and direction of movement on dark roads, and also adapted to serve as a suitable parking light and generally to serve as a means of minimizing the likelihood of accident incident to the use of vehicles of the indicated type; and with these objects in view the invention consists in a device of which a preferred embodiment is illustrated in the accompanying drawing, wherein:

Figure 1 is a view of a lamp embodying the invention applied in the operative position to a vehicle.

Figure 2 is a longitudinal sectional view of the lamp including a diagram of the wiring system.

The lamp in general construction preferably embodies a relatively elongated casing 10, provided at its front and rear ends with lenses 11 and 12 in rear of which are arranged lighting units 13 and 14 preferably consisting of incandescent electric light bulbs served by and arranged in circuit with the lighting system of the automobile or car in connection with which the device is used, the lead wires 15 and 16 in connection respectively with said lighting units having independent controlling switches 17 and 18.

The casing is provided with a suitable clamp adapted for attachment to a convenient portion of the vehicle, and the device is designed particularly to be applied to the vehicle at the left side and near the front, as upon the forward left hand wheel guard as shown in the drawing, with the length of the casing disposed parallel with the direction of movement of the car and with the lenses 11 and 12 respectively directed forwardly and rearwardly.

The forward lens is preferably green and the rear lens yellow, so that whether the car is progressing and the lamp is being used as a running light, or is stationary or parked, the forwardly directed rays of green light serve to indicate the position of the car which, in accordance with the well known and recognized nautical rules must always be to the right of the green light as viewed by an observer facing the same, if the vehicle is approaching. The forwardly directed green light may and is preferably used, not only as a running light but as a parking light and the rearwardly directed light is preferably used only for parking purposes and for this reason should as above indicated be controlled by a separate switch.

In the preferred embodiment of the device the casing 10 is divided into front and rear compartments by a transverse partition 20 to which the sockets 21 of the lighting units 13 and 14 are attached as a convenient means of arranging the same in the proper position centrally in the casing, and the clamp or means for attaching the device to the vehicle may consist of the tubes 22 headed as at 23 within the cylindrical wall of the casing and exteriorly threaded for engagement by the inner and outer nuts 24 and 25 for arrangement respectively above and below the wheel guard 26 or similar portion of the vehicle to which the lamps may be attached, said tubes which also act as fastening bolts, serving as convenient conduits through which the lead wires 15 and 16 are extended to the lamp sockets, as indicated clearly in Figure 2 of the drawing.

Having thus described the invention, what I claim is:—

A signal device provided with a casing, removable closures for opposite ends of said casing, said casing having a transverse partition therein and integral therewith, sockets secured to and extending from opposite sides of said partition, a plurality of signal means disposed one in each socket, a plurality of tubes depending through openings in said casing, and each on a different side of said partition, said tubes having retaining heads disposed within the casing below and in spaced relation to the sockets, said tubes being exteriorly screw threaded, nuts operable on the threads of said tubes to engage the exterior of the casing to secure the tubes rigidly thereto, said tubes constituting conduits for electrical conductors associated with said signal means, and said tubes being attachable to a support whereby each tube will counteract the tendency of the other tube to turn therefrom as a fulcrum.

In testimony whereof I affix my signature in presence of two witnesses.

WILLIAM F. POTTER.

Witnesses:
ALBERT W. KING,
JOHN L. FIESTER.